United States Patent [19]

Kelley et al.

[11] 4,278,102
[45] Jul. 14, 1981

[54] DISASTER ACTIVATED SHUT-OFF VALVE

[76] Inventors: Charles H. Kelley, 12023 Rock Crest Rd.; Jimmie W. Crane, 11936 Rock Crest Rd.; Albert D. Ray, 12140 Rock Crest Rd., all of Lakeside, Calif. 92040

[21] Appl. No.: 22,050

[22] Filed: Mar. 19, 1979

[51] Int. Cl.³ .............................................. F16K 17/36
[52] U.S. Cl. ........................................ 137/39; 137/460
[58] Field of Search ....................... 137/38, 39, 460; 180/282, 284

[56] References Cited

U.S. PATENT DOCUMENTS

| | | | |
|---|---|---|---|
| 1,260,739 | 3/1918 | Yeamans | 137/38 |
| 1,302,749 | 5/1919 | Yeamans | 137/38 |
| 1,405,950 | 2/1922 | Stafford | 137/38 |
| 1,742,685 | 1/1930 | Brandon | 137/38 |
| 2,615,460 | 10/1952 | Crow | 137/38 |
| 2,615,461 | 10/1952 | Crow | 137/39 |
| 3,407,827 | 10/1968 | Follett | 137/39 |
| 3,994,360 | 11/1976 | Leibold | 137/38 X |
| 4,185,651 | 1/1980 | Paulson | 137/38 |

Primary Examiner—Robert G. Nilson
Attorney, Agent, or Firm—Ralph S. Branscomb

[57] ABSTRACT

An automatic shut-off valve is used at the inlet point of a fuel line carrying a gaseous or liquid fuel into a house or the like, the valve being adapted to terminate the flow of gas or liquid upon the experiencing of a shock or vibration by the valve as would be produced by an earthquake, with the valve head being so positioned to be actuated by a sudden surge of flow to shut the valve in the event a ruptured gas line causes a quick inordinately rapid gas or liquid flow in the system. The principle utilized to actuate the closing of the valve as a function of a certain minimum amplitude of vibration or shock is a ball weight which in normal use rests on a pedestal which in turn maintains the valve head away from the valve seat in the supply line, this ball being designed to topple from its supporting pedestal during an earthquake or other vibration, thus freeing the valve head to seat under spring tension such as to block the fluid flow.

5 Claims, 4 Drawing Figures

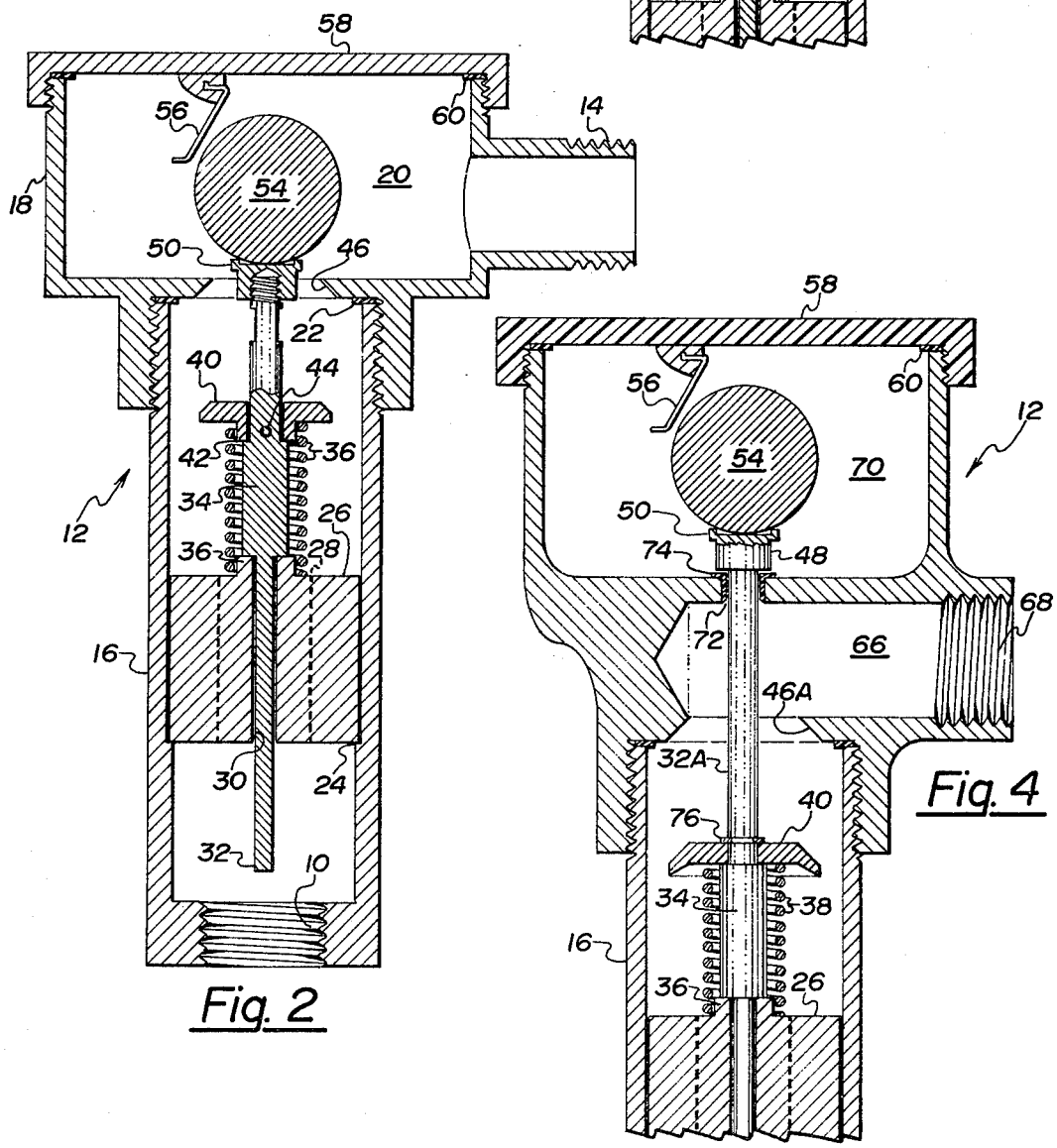

DISASTER ACTIVATED SHUT-OFF VALVE

BACKGROUND OF THE INVENTION

It is a well known fact that during earthquakes, in addition to the primary damage caused by the tremors and vibrations, which can be of a very high amplitude, a great deal of secondary damage due to fires and flooding also occurs. Despite this, and despite the well known fact that California is due for an earthquake of major proportions, dwellings and other structures are not typically provided with automatic shut-off valves in gas lines and other fluid fuel lines, such as propane or oil. Once gas lines have been ruptured by the trauma of an earthquake and the ruptured lines fill buildings with highly flammable gases, any spark or remaining pilot light can trigger a conflagration that may leap from building to building and consume major portions of an entire city, as has happened in San Francisco.

There have in the past been valves designed to implement the purpose of checking fluid flow during a trauma, and some such valves utilize a balanced ball for the valve triggering element as does applicant. Salient among such art are the following U.S. Patents: U.S. Pat. No. 1,742,685 issued to A. H. Brandon on Jan. 7, 1930, and U.S. Pat. No. 2,615,461 issued to W. W. Crow on Oct. 28, 1952. Both of these valves were provided to protect dwellings and other buildings against gas flow during earthquakes and utilize a balanced ball. Two other patents were issued to E. N. Yeamans on Mar. 26, 1918, and May 6, 1919, having U.S. Pat. Nos. 1,260,739 and 1,302,749, respectively. The latter two valves utilize a balanced ball principle and deploy the valves on railroad locomotives to terminate boiler steam flow into the operational areas of the locomotive in case of overturn of the train.

The above cited valves would of course technically operate according to the principles described therein, but are somewhat complicated in their implementation and thus questionable in their reliability. It is naturally desirable in such an application that the valve be of the utmost simplicity and construction to minimize the tendency to malfunction as the valve may be in place for years without ever being operated. It is also highly desirable that the valve be very quickly and easily checked so that it may be periodically determined that the valve is still in working order.

SUMMARY OF THE INVENTION

The present invention fulfills the above-mentioned needs by providing a simple, foolproof shut-off valve utilizing the balanced ball principle to respond positively to a traumatization of the valve casing by an earthquake or the like, and incorporating a double function of antisurge. The absolute simplest possible trauma-sensitive mechanism is utilized by a vertically extended shaft mounting the ball pedestal on the top thereof and the valve head on a lower portion, this stem being spring biased upward but maintained down by the ball until the ball is shaken free of the pedestal. When this occurs, naturally the valve head seats under the spring tension and the valve must be re-set by unscrewing a removable cap in the ball housing chamber and setting the ball back on the pedestal.

The anti-surge function is implemented in a dual fashion, first by the orientation of the valve head relative to the valve seat such that a surge would cause movement of the valve seat toward closure. A special dislodgement element provided in the ball chamber defining walls dislodges the ball from its pedestal during movement of the valve head caused by the surge, to achieve an identical effect to that of an earthquake trauma, that is, the ball is knocked free of its pedestal freeing the valve head to close.

In one implementation utilized strictly for a gas line, the ball itself is in the gas flow passageway rather than being isolated, so that a sudden rush of gas not only will be effective upon the valve head which acts in its anti-surge mode, but additionally, dislodgement of the ball is achieved by the sudden increase in gas current, incorporating a double safety into the valve.

BRIEF DESCRIPTION OF THE DRAWINGS

FIG. 2 is a sectional view of the valve shown in FIG. 1;

FIG. 3 is a sectional view of the valve similar to FIG. 2, but with the valve head closed and the weight ball dislodged;

FIG. 4 is a sectional view of a modified embodiment of the valve.

DETAILED DESCRIPTION OF THE PREFERRED EMBODIMENT

Figure 1:
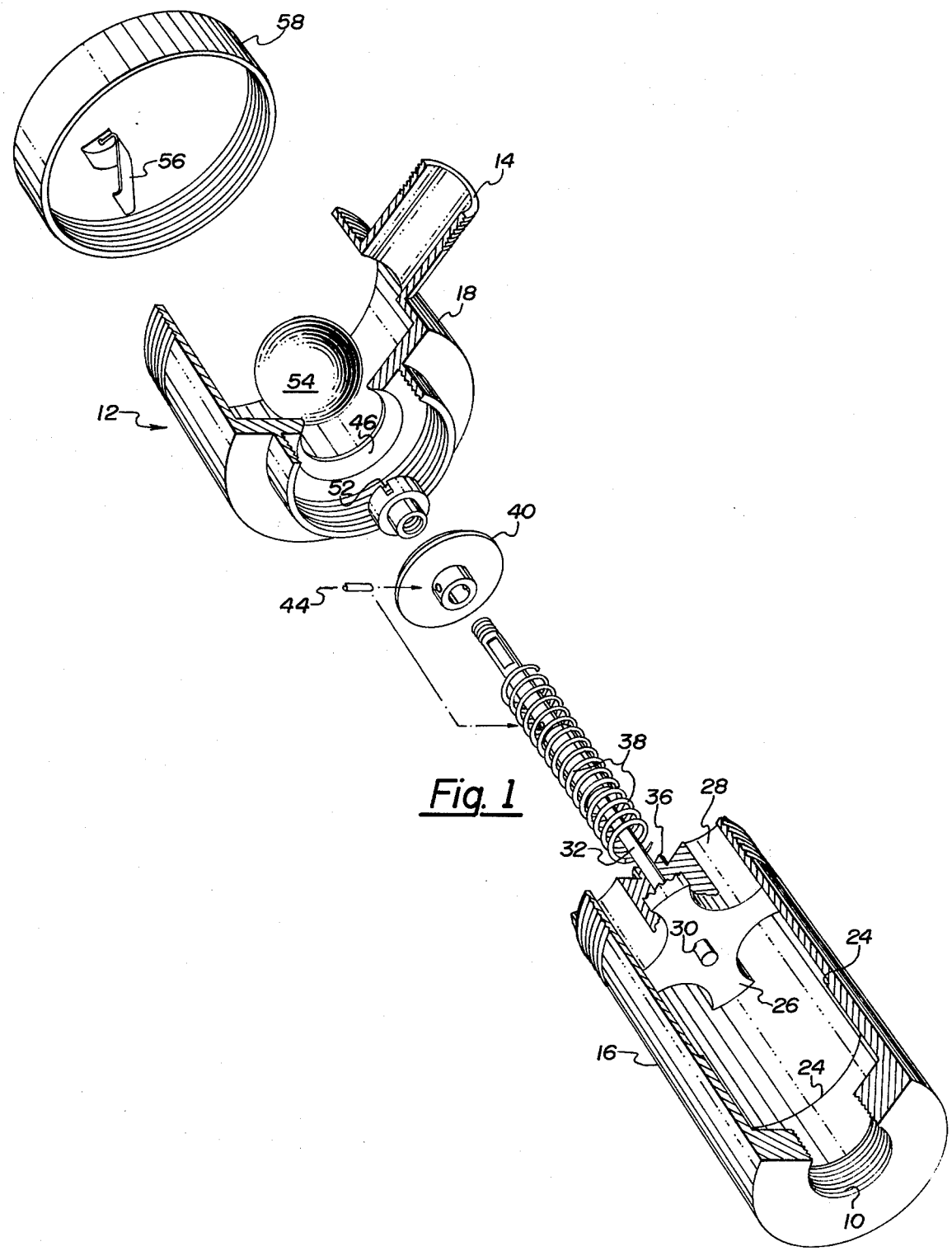
FIG. 1 is an exploded perspective view with portions cut away of one embodiment of the valve.

The first of the two embodiments of the valve is shown in FIGS. 1 through 3 and differs from the second embodiment in that the ball is disposed directly in the fluid passageway, which would render this embodiment suitable for gas line use, but only under very special circumstances could it be used with a liquid as naturally, the liquid flow would cause the ball to be dislodged.

In the first embodiment, a continuous gas flow passageway is defined from the threaded pipe inlet 10 through the valve casing 12 and out the outlet stub pipe 14. The valve casing 12 is defined in two basic parts, a lower vertical upright segment 16 and an expanded portion 18 which defines chamber 20. These two portions of the chamber are screwed together and sealed with a gasket 22. The inlet 10 could be bored to accommodate different pipe sizes ranging, for example from ½ inch to 1¼ inch, and by providing a thick-walled outlet pipe 14 a range of alternative sizes could be threaded onto the pipe so that the same sized valve body would have universal pipe size application within a certain range.

Within the lower upright segment 16 of the valve casing an annular shoulder 24 is defined which seats a guide sleeve 26. The guide sleeve has arcuate cutaway portions 28 to avoid interference with the gas flow and a central bore 30 receives valve stem 32 as is best seen in FIG. 2. The valve stem has an enlarged boss 34 which rests on a centering nib 36 formed at the top of the guide sleeve 26. A compression spring 38 encircles the centering nib and the boss 34 and is extended between the guide sleeve and the valve head 40 which is maintained snuggly seats against the shoulder 42 of the valve stem by means of a retainer pin 44. As either a replacement or a supplement to the retainer pin or the alternative retainer clip described below, the valve head could be press-fitted onto the stem 32, both for manufacturing expedience and, more importantly, to ensure against gas leakage.

It can be clearly seen from FIG. 2 that were it not for the restraining effects of the ball described below, the valve head 40 would rise together with its stem 32 under the action of the spring 38 until the valve head seated in valve seat 46 defined at the bottom of the chamber 20. The seating of the valve head defines a leak-proof obstruction of the flow passageway outlined above.

At the top end of valve stem 32, a threadedly engaged pedestal 48 can be seen in FIGS. 1 through 3. This pedestal has an annular rib 50 with a pair of opposed slots 52 defined in it to prevent a suction lock to form between the pedestal 48 and the overlying ball weight 54 in the event of condensation of moisture or other foreign matter entering the ball chamber. As can be seen in FIG. 2, the weight ball balances on the pedestal 48 with a degree of stability dependent on the diameter of the pedestal rib 50. The desired pedestal dimension would, of course, depend on other factors such as the threshold of vibrational violence to be reached before the valve is actuated, currently intended to be the equivalent of an earthquake which would register about 3.0 on the Richter Scale. Upon experiencing such a vibration, the valve, which will have been carefully installed with the valve stem vertical, will be shut off by the dislodgement of the weight ball 54 from the pedestal.

In the event firemen at the scene of a fire or other persons would want to actuate the valve, or ensure that it had self-actuated, the valve can be struck with a heavy stick or other instrument to simulate the trauma of an earthquake. It would also be within the scope of the instant disclosure to incorporate physical or electromechanical auxilliary activation means such as a push rod passing through the ball housing or a remotely triggered solenoid operated plunger to dislodge the ball.

In addition to activation by trauma alone, it is desirable that an inordinant surge in the gas velocity also be effective in terminating gas flow as such a surge is indicative of a ruptured line. It should be noted, therefore, that the positioning of the valve head 40 relative to its seat 46 is such that during a surge, the valve head would be caught in the flow and driven toward the seated position. So that the head is not blocked by the location of the ball 54, a dislodging element 56 in the form of a piece of spring steel is mounted on the inside of the cap 58 which defines the top of the ball chamber 20 and seals same by virtue of gasket 60.

Also, as mentioned above, the weight ball 54 itself is disposed directly in the gas passageway and is likewise subject to dislodgement from the gas flow in the event of a surge. The combined effect of the gas acting directly on the ball and the valve head 40 is shown in FIG. 3, wherein arrow 62 indicates generally the trajectory of the periphery of the weight ball as it is dislodged from the pedestal by the clip 56.

To reset the valve the cap 58 is removed by unscrewing same and the ball is simply replaced on the pedestal. To achieve this, of course, there must be a main shut-off valve upstream of the valve described herein, and said shut-off valve is in fact shut off prior to resetting the valve shown herein. The same procedure that is used to reset the valve could, of course, be used to check for proper functioning of the valve periodically during its life.

The second embodiment of the valve is shown in FIG. 4, and this embodiment differs in that the weight ball 54 is no longer directly deployed in the gas flow passageway so that the valve can be used for liquids as well as gas. All parts which are identical with the prior embodiment will be numbered identically for the sake of simplicity, and will not be redescribed. The difference between the first embodiment and the second lies in a modified valve stem 32A which is longer in its upper portions than valve stem 32 so that it functions properly with the modified portion 64 of the valve casing. The casing 64 defines a valve seat 46A identical to seat 46 and defines a lower chamber 66 which communicates from the valve seat to a threaded outlet 68. An upper chamber 70 defined over the chamber 66 houses the ball weight 54, and an opening 72 lined with a bushing 74 passes the valve seat 46A therethrough. As is clear from FIG. 4, the sole result of this modification is to remove the ball weight 54 from the fluid passageway into a separate chamber so that it would not be dislodged by the flow of liquid if the valve were intended to be used for liquid propane or fuel oil rather than gas. Because the liquid fuels for which the valve would be used are non-corrosive by nature, the opening 72 need not be a tight seal against the valve stem although the liquid would be prevented from entering the chamber 70 by virtue of the air pressure extent therein. It should be noted also that as a possible minor modification of construction, the valve head 40 in the second embodiment is retained on the valve seat 46A by means of a clip 76 rather than the pin 44 used for the first embodiment.

The embodiment of FIG. 4 has the removable cap 58 and the dislodging spring 56 as did the first embodiment, and surge action on the valve head would likewise cause the ball to be dislodged by the spring to consummate the anti-surge function of the unit.

When utilized in its alternative embodiments for gas or fluid fuel hazard prevention, the valve is reliable due to the absolute simplicity of its design and the absence of a mechanical linkage more complicated than a single, straight valve stem connecting the ball pedestal and the valve head. So simple is the operation of the valve that a malfunction is hard to imagine. Also simple, is the technique by which one can shut off the main fluid valve, and check the functioning of this emergency valve simply by removing the upper cap and operating the valve stem manually a time or two to insure proper seating and proper movement within the valve casing.

The invention claimed is:

1. A vibration shut-off valve comprising:
   (a) a valve body defining a gas flow passageway;
   (b) a valve seat disposed in said passageway;
   (c) a valve movable between a seated and an unseated position and having means biasing same into a seated position to block said passageway;
   (d) a pedestal mounted in said body for limited vertical movement and including a mechanical linkage between said pedestal and said valve head to hold said valve head in said open position when said pedestal is depressed; and
   (e) a weight ball balanced on said pedestal within said flow passageway depressing said pedestal to maintain said valve head unseated and capable of being dislodged from said pedestal either by an inordinant surge of gas flow within said passageway by virtue of the disposition of said ball in said flow passageway, or by the vibration of an earthquake, to free said valve head to move into said seat, thus blocking gas flow in said low passageway.

2. The structure according to claim 1 wherein said gas flow passageway includes a vertical segment and said mechanical linkage comprises a vertical stem disposed in said passageway and said rod mounts said pedestal and said valve head to move same concomitantly.

3. The structure according to claim 1 wherein a portion of said flow chamber is expanded into an enlarged chamber housing said ball and pedestal and including a removable cap providing access to said chamber to reset said ball when same has been dislodged.

4. The structure according to claim 3 and including dislodging element mounted to said cap in the pathway of said ball when said pedestal is rising, and said linkage is effective to raise said pedestal when said valve head is struck by a surge in gas flow, whereby said ball will be dislodged from said pedestal by said element when said valve head is struck by a surge.

5. A vibration shut-off valve comprising:
 (a) a valve body defining a gas flow passageway;
 (b) a valve seat disposed in said passageway;
 (c) a valve upstream of said seat and movable between a seated and an unseated position and having means biasing same into a seated position to block said passageway;
 (d) a pedestal mounted in said body for limited vertical movement and including a mechanical linkage between said pedestal and said valve head to hold said valve in open position when said pedestal is depressed;
 (e) a weight ball balanced on said pedestal and counteracting said biasing means to depress said pedestal to maintain said valve head unseated, and capable of being dislodged from said pedestal by the vibration of an earthquake, whereby said valve can be seated to block gas flow either by an inordinant surge of gas flow within said passageway by virtue of the disposition of said valve upstream from said valve seat in said passageway, or by the dislodgment of said ball by vibration; and
 (f) a dislodging element mounted in said valve body and positioned to dislodge said ball upon said valve being shut by an inordinant surge of gas flow, whereby upon being so shut said valve remains shut until reset.

* * * * *